United States Patent [19]

Landau et al.

[11] 4,165,159

[45] Aug. 21, 1979

[54] MICROPROCESSOR CONTROLLED FILMSTRIP PROJECTOR

[75] Inventors: John V. Landau, Mountain Lakes, N.J.; Marvin I. Mindell, Pittsford; William T. Daly, Rochester, both of N.Y.; J. David Garland, Passaic, N.J.; Arthur B. Price, Byron, N.Y.

[73] Assignee: The Singer Company, New York, N.Y.

[21] Appl. No.: 890,889

[22] Filed: Mar. 28, 1978

[51] Int. Cl.² .................. G11B 31/00; G09B 1/00; G03B 21/00
[52] U.S. Cl. .................................... 353/15; 35/8 R; 360/80
[58] Field of Search ............... 360/72, 74, 80; 353/15, 353/26 A; 35/8 R

[56] References Cited

U.S. PATENT DOCUMENTS

| | | | |
|---|---|---|---|
| 3,501,851 | 3/1970 | Price et al. | 360/80 |
| 3,922,078 | 11/1975 | Uchidoi et al. | 353/15 |
| 3,937,927 | 2/1976 | Weigert | 353/26 A |
| 4,027,958 | 6/1977 | Shigeta et al. | 353/15 |
| 4,075,668 | 2/1978 | Keach | 353/15 |
| 4,115,824 | 9/1978 | Mindell | 360/80 |

*Primary Examiner*—Steven L. Stephan
*Attorney, Agent, or Firm*—Charles R. Lewis

[57] ABSTRACT

A microprocessor is utilized to monitor and control the operation of an image projector and a magnetic tape cassette player. Inaudible cueing tones recorded on the tape allow the recorded narrative to be kept in synchronization with the image projected. A sync counter within the microprocessor keeps track of the amount and direction by which the image and tape are out of synchronism. The microprocessor controls a visual indication to the operator that shows the direction in which the tape must be moved to regain synchronization. When the tape is moved forward to achieve synchronization, the microprocessor will stop the tape after the cue pulse that precedes the narrative for the associated image. When the tape is moved in the reverse direction to achieve synchronization, the microprocessor will stop the tape just beyond the cue pulse at the beginning of the desired narrative. Accordingly, when the tape player is placed into the play mode, the microprocessor will mute the audio until that cue pulse is sensed and inhibit the normal film advance for that cue pulse. A frame counter within the microprocessor keeps track of the amount and direction by which the projected image has moved from a reference or saved image location. Return to the reference image and associated narrative is initiated by the operator. Once initiated, the image bearing means is automatically returned to the position that projects the reference image under the control of the microprocessor which also visually indicates to the operator the direction the tape must be moved to synchronize the narrative with the reference image. When moved to the proper location, the tape is stopped by the microprocessor. The image which constitutes the reference image can readily be changed by the operator.

38 Claims, 7 Drawing Figures

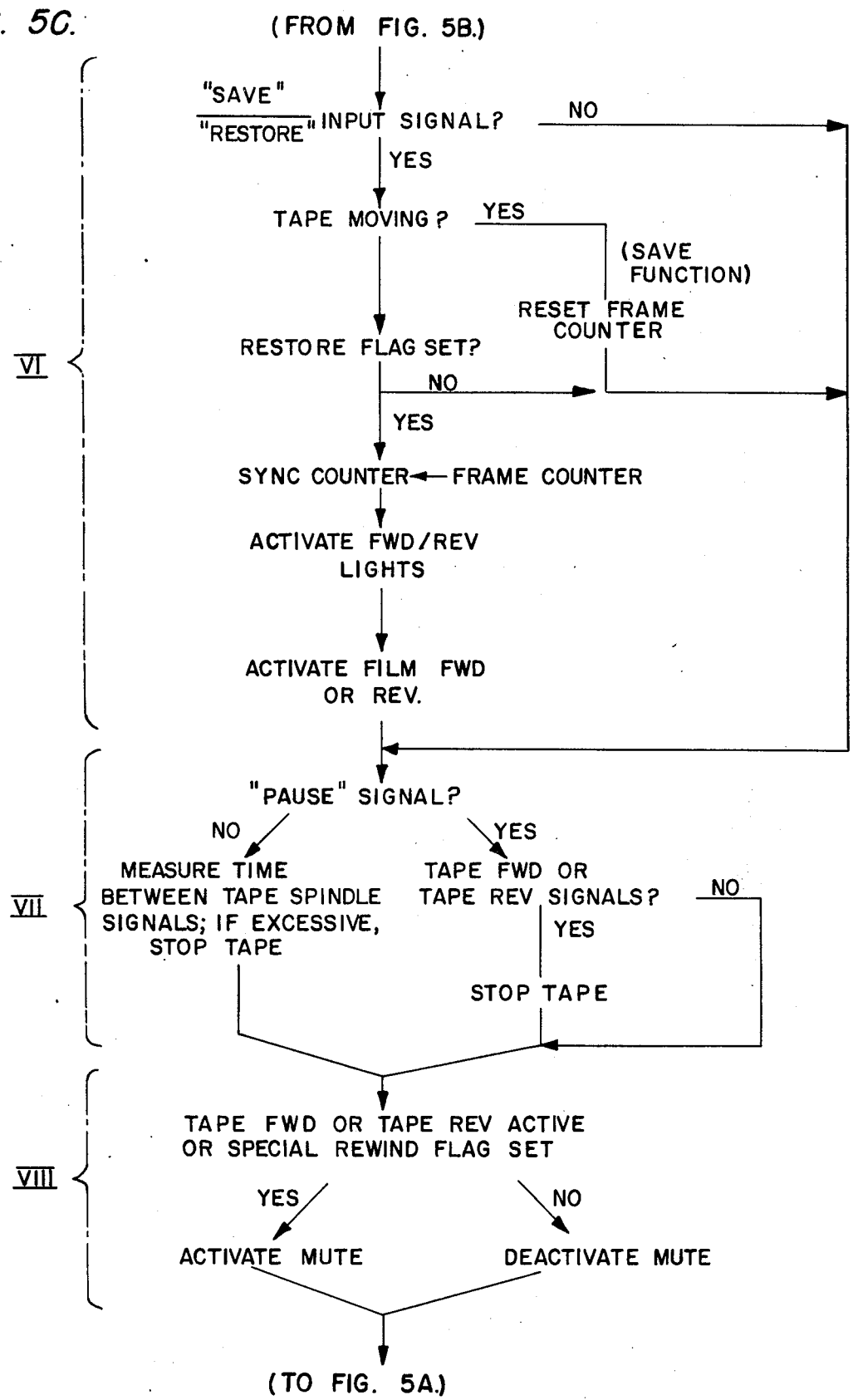

MICROPROCESSOR CONTROLLED FILMSTRIP PROJECTOR

BACKGROUND OF THE INVENTION

1. Field of the Invention

The present invention relates to automatic audio visual equipment utilizing a visual image projector operating in synchronism with control signals and audio program signals recorded on a magnetic tape. More specifically, the invention relates to a microprocessor controlled system for regaining synchronization between the visual image projected and the audio program recorded on the magnetic tape.

2. Description of the prior art

A species of audi-visual equipment intended for educational use utilizes a compact cassette magnetic tape playback machine operating in synchronism with a visual image projector such as a slide or filmstrip projector. Typically, two types of signals are recorded on the magnetic tape. Audio signals are recorded to provide an audio instruction program to accompany the visual presentation, and cue tone bursts are recorded to provide signals to advance a slide or filmstrip frame at an appropriate point in the audio instruction program. Cue tone signals may also be provided for other instructional purposes.

The recording of the audio instruction program and the cue tones may be done in accordance with either a superimposed system or a separate track system as specified in American National Standards Institute (ANSI) specification PH 7.4–1975.

The super-imposed system provides for the recording of low frequency cue tone bursts on the same track as the audio instruction program. The cue tone burst may be recorded simultaneously with, and/or in sequential relation to the audio information signal. In the case of simultaneous super-imposed recording, the cue tone burst is recorded directly over the audio information signal. In the case of sequential super-imposed recording, the audio information signal is recorded between adjacent cue tone bursts. As used herein, the terms super-imposed, and mixed denote either simultaneous or sequential super-imposed recording. The cue tones consist of 50 Hz±5% tone burst. The burst time duration is 0.45±0.07 seconds for visual advance and 2.00±0.25 seconds for visual advance and program stop. During playback the magnetic tape transport means transports the magnetic tape past the sensing surface of a playback head. The playback head picks up both the audio instruction program signals and the cue tones for reproduction. In order to prevent the lower frequency portion of the audio instruction program signals from being misinterpreted as a cue tone signal and causing spurious visual advance, the output of the playback head is passed thru one or more frequency responsive filters to effectively separate the audio signals from the control signals. The filter(s) may be a band pass filter having a center frequency of 50 Hz. The audio program may be passed through a high pass filter having a transition frequency of 125 Hz and a minimum attenuation rate of 24 db/octave then presented to the student thru a loudspeaker or earphone and the cue tone signals are used to provide visual advance synchronized with the audio program.

The separate track system records the audio program on a first track and the cue tone on a second track. A 1,000 Hz cue tone is provided for visual advance and a 150 Hz cue tone is provided to stop the program. In addition, a 400 Hz and a 2300 Hz cue tone may be provided for unassigned control purposes. A first reproduce head picks up the audio signals from the first track and a second reproduce head picks up the control signals from the second track. Frequency selective filters then separate the various cue tones to perform their intended control functions.

The superimposed and separate track systems both have advantages and disadvantages. The superimposed system allows for the maximum recorded audio instruction program time for each compact cassette but the frequency restricted cue tone limits the number of control functions. Also, it is very difficult to rearrange the cue tones once the superimposed audio program and cue tones have been recorded. The separate track system allows a larger number of control functions and permits convenient erasing and rearranging of the cue tones. However, the use of a separate track system reduces the amount of audio program material that can be recorded.

A draw back of existing audio visual equipment using the superimposed system is that it is difficult to maintain audio visual synchronization when returning to a prior art in the audio visual program, or when advancing to a subsequent point in the program.

The following two examples illustrate these drawbacks.

1. A student desires to return to a prior point in the audio-visual program to review material. Using the manual control provided on the projector the student decrements the visual presentation in the reverse direction until the desired visual presentation is reached. The tape transport is then rewound on a trial and error basis until the appropriate point on the audio program is located. The synchronized audio-visual program is then resummed.

2. A student desired to advance to a subsequent point in the audio visual presentation to avoid material previously learned. Using the manual control provided on the projector, the student increments the visual presentation in the forward direction until the desired visual presentation is reached. The tape transport is then fast forwarded on a trial and error basis until the appropriate point in the audio program is located. The synchronized audio-visual program is then resummed.

As is readily apparent, any departure from the predetermined audio-visual program requires the student to fast forward or rewind on a trail and error basis to locate the appropriate point in the audio program. It would be very desirable to provide means for automatically retaining or regaining audio-visual synchronization during or after rapid manual incrementing of the visual program in a forward direction or decrementing of the visual program in a reverse direction.

Conventional tape transports for compact cassettes, when in fast forward or fast rewind modes, provide a relatively constant angular velocity to the take up reel spindle. As the tape winds onto the take up reel, the effective radius of the take up reel increases. The linear velocity or speed of the tape being transported past the playback head is a function of the effective radius of the take up reel. During an end to end rewind or fast forward of a conventional compact cassette the linear tape velocity past the reproduce head can vary from approximately six to twenty-four times the normal tape playing speed of 1.875 in/sec (4.76 cm/sec). Thus the linear tape velocity can vary from a low of 11.25 in/sec (28.56 cm/sec) to a high of 45 in/sec (114.25 cm/sec). The frequency of the voltage induced into the playback head is directly proportional to the linear tape velocity past the head. During end to end rewind or fast forward of a conventional compact cassette the recorded 50 Hz cue tones can induce a signal ranging in frequency from 300 Hz to 1,200 Hz, and the low frequency portion of the audio program (125 Hz) can induce a playback signal ranging from 750 Hz to 3,000 Hz. Induced voltage frequency ranges of the cue tones and the audio program overlap. The 50 Hz filters used to separate the superimposed cue tones and audio program during normal playback can not be used during rewind or fast forward. A pre-set filter for the range of cue tone frequencies cannot be used since the overlapping audio program material can pass through the filter and be misinterpreted as a cue tone to cause a spurious visual advance count.

In U.S. Pat. No. 4,121,263 filed on July 27, 1977 and entitled Method and Apparatus for Control Signal Separation To Regain Synchronization Between A Visual Image Projector And An Audio Program, the contents of which are incorporated herein by reference, apparatus is described that enables the cue tones to be successfully separated from the audio program while the tape transport is operated in either the fast forward or fast reverse mode of operation. The apparatus described functions with a magnetic tape, as does the present invention, that contains either a superimposed system or a separate track system as described above. In U.S. Pat. No. 4,115,824 filed on July 7, 1977 and entitled Method For Regaining Synchronization Between A Visual Image Projector And An Associated Audio Playback Machine, the contents of which are incorporated herein by reference, a method of utilizing the cue tones separated from the tape at high tape speeds to regain synchronization between the projected image and the audio program while the tape travels at high speed is disclosed. In the method and apparatus described in these copending applications, it is necessary for the machine operator to change the projected image to the image prior to the desired image when the tape is to be moved in a reverse direction to regain synchronization. This requirement is confusing to the operator and can result in operator errors. Further, no provision is made to automatically return the projected image and sound program to a saved or Book-Mark location. Such a capability is useful in audio visual educational systems to automatically return to the beginning to the audio-visual program after it is completed, return to a selected portion of the audio-visual program for review or to select which one or two or more audio-visual programs recorded on a single filmstrip and magnetic tape is to be initiated.

Accordingly, one object of this invention is to provide improved apparatus for regaining synchronization between a projected image and an associated sound program recorded on a magnetic tape.

Another object of this invention is to provide improved apparatus for regaining synchronization between a projected image and an associated sound program recorded on a magnetic tape wherein the tape is automatically synchronized with the projected image whether the tape must be moved in either the forward or reverse direction.

Still another object of this invention is to provide improved apparatus for regaining synchronization between a projected image and an associated sound program recorded on a magnetic tape wherein said projected image is automatically returned to an operator selected reference image and the sound program of the reference image is automatically synchronized therewith under the control of an operator.

A further object of this invention is to provide improved apparatus for regaining synchronization between a projected image and an associated sound program recorded on a magnetic tape that utilizes a microprocessor to monitor and control image projection and magnetic tape transport apparatus.

SUMMARY OF THE INVENTION

A microprocessor is provided for use with a visual image projector and an associated magnetic tape transport machine where the magnetic tape has both cue tone and audio program material recorded thereon and the magnetic tape transport machine includes a fast forward mode and fast rewind mode. The combined apparatus quickly regains synchronization between a selected visual presentation and its associated audio program after the visual image projector has been changed with respect to the audio program, or the audio program changed with respect to the visual image projector. The apparatus also allows a user to command that a certain projected image be saved and then subsequently command the apparatus to automatically return to that image at a later time and to indicate in which direction the tape must be moved to have the sound program synchronized with the saved image. Once the tape is moved to the position where the audio program is synchronized with the saved image, the apparatus automatically stops the tape.

The apparatus for regaining synchronization between the series of image presentations and the audio accompaniment therefor recorded on the magnetic tape and having the associated cue tones recorded thereon in accordance with the present invention includes a projector for projecting a series of images; a tape transport for said magnetic tape and including means for separating said cue tones from said audio accompaniment as said tape is moved in a fast forward or a fast reverse direction; and an automatic processor coupled between the projector and the tape transport. The processor includes means for receiving the cue tones from the moving tape for keeping a first count that is indicative of the synchronization, or lack of synchronization, between the projected images and the audio accompaniment. The count is indicative of the number of cue tones produced by moving the magnetic tape that are needed to regain synchronization betwen the projected images and the sound. The tape transport enables the magnetic tape to be moved in a forward direction to produce a number of cue tones equal to the count to regain synchronization between the images and the sound. The tape transport also enables the magnetic tape to be moved in a reverse direction to produce a number of cue tones that is greater than the count by one to regain synchronization between the images and the sound. The processor automatically causes the tape transport to stop the magnetic tape when it is moved in the forward direction to produce the number of cue tones equal to the count and automatically causes the tape transport to stop the magnetic tape when it is moved in the reverse direction to produce the number of cue tones that is greater than the count by one. The first count is positive when the magnetic tape must be moved in a forward direction to regain synchronization and is negative when the magnetic tape must be moved in a reverse direction to regain synchronization.

The projector includes means for moving image bearing media through the projector in a forward and in a reverse direction to change the projected image and produces a pulse signal each time a projected image is changed. The processor receives the signals indicative of the image changes to provide a second count that indicates the number of image changes, if any, that separate a current projected image from an operator selected reference image on the image bearing media. The processor has an output coupled to the projector for controlling the means for moving said image bearing media and is selectively responsive to the second count to cause the means for moving the image bearing media to move the image bearing media to a position where the reference image is projected. The second count is positive when the image bearing media must be moved in a forward direction to project the reference image and is negative when the image bearing media must be moved in a reverse direction to project the reference image. When the processor is made selectively responsive to the second count, it also causes the second count to be non-destructively added to the first count to enable the tape transport means to synchronize the sound with the reference image.

BRIEF DESCRIPTION OF THE DRAWINGS

The various features, objects and advantages of the present invention will be readily understood from consideration of the following detailed description taken in conjunction with the following drawings wherein like reference characters designate like or corresponding parts throughout the several views, and wherein:

FIGS. 5A, 5B and 5C constitute a flow chart that describes the automatic program which is utilized with the microprocessor shown in FIG. 4.

DESCRIPTION OF THE PREFERRED EMBODIMENT

Figure 2:
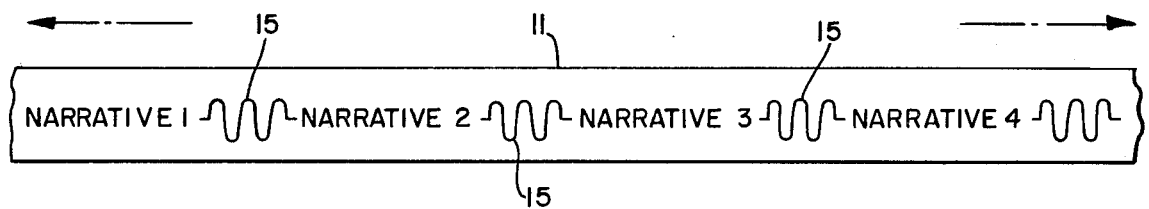
FIG. 2 schematically illustrates a corresponding magnetic tape segment having cue tones and associated audio narrative recorded thereon.
Figure 3:
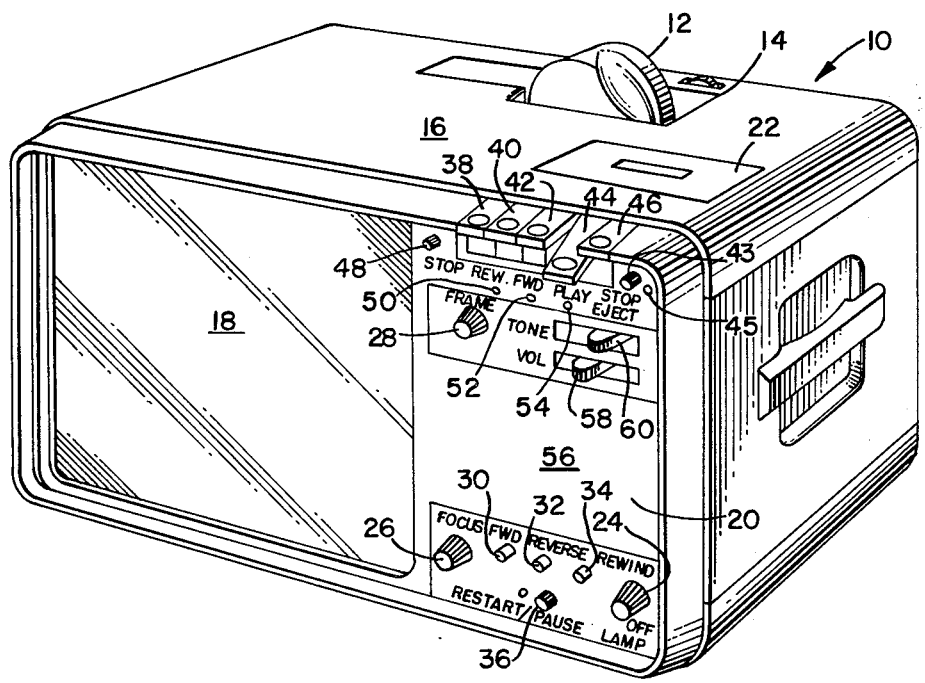
FIG. 3 is a perspective view of a filmstrip audio-visual projector which may be utilized with the present invention.

The present invention may be incorporated into a visual image projector such as the rear screen filmstrip projector 10 shown in FIG. 3. The projector includes a cartridge 12 containing a filmstrip 13 (FIG. 1) mounted in a cavity 14 on the top surface 16 of the projector 10. The filmstrip 13 is withdrawn from the cartridge 12 by filmstrip transport means and incremented on a frame by frame basis past projection means (not shown) for projection onto the viewing screen 18 located on the front panel 20 of the projector 10. The present invention may also be incorporated into other types of audio-visual equipment, including, but not limited to, a slide projector. A hinged access door 22 is provided on the top surface 16 of the projector 10 to permit the mounting of a cassette containing a magnetic tape 11 (FIG. 2) onto a conventional magnetic tape transport means located within the projector 10. The filmstrip projector 10 controls includes an on/off knob 24, an image focus control 26, a framing control 28, a push button 30 for manual incrementing of the filmstrip in a forward direction, a push button 32 for manual decrementing of the filmstrip in a reverse direction, and another push button 34 to rewind the filmstrip into the filmstrip cartridge 12. A restart/pause button 36 is provided to allow the projector operator to selectively interrupt the audio visual program. The magnetic tape transport controls include five depressable keys 38, 40, 42, 44, and 46. The first key 38 initiates a stop command, the second key 40 initiates the magnetic tape fast rewind mode, the third key 42 initiates a fast forward mode, the fourth key 44, shown in the depressed position in FIG. 3, initiates a playback mode, and the fifth key 46 initiates the stop command and ejects the compact cassette. A push button 48 is used to provide the electronic means, described in more detail below, with an initial synchronism signal. Another push button 43 is used to provide, in a manner as fully described hereinbelow, a save/restore feature. Four indicator means, such as light emitting diodes 45, 50, 52, and 54 are located beneath the magnetic tape transport keys 38, 40, 42, 44, 46 and adjacent to the save/restore button 43 and provide indications to the projector operator as described below. A magnetic tape transport means suitable for use with the present invention is model number CT-1901C manufactured by the Vortex Manufacturing Company of Tokyo, Japan.

The projector 10 is provided with conventional playback electrical circuits (not shown) that are responsive to the superimposed cue tones and audio program signals recorded on the magnetic tape 11. During normal play (1.875 in/sec) the cue signals are separated from the audio signals by these electrical circuits. The cue tones provide visual advance in synchronism with the audio program which is reproduced thru a loudspeaker (not shown) located behind a perforated portion 56 of the front panel 20. A slide control 58 is used to control the audio volume, and another slide control 60 is used to control the audio tone.

A more detailed description of the filmstrip projector and cartridge illustrated in FIG. 3 may be had by referring to following U.S. Pat. Nos. filed on Sept. 20, 1976: 4,093,142; 4,068,935; 4,068,809; 4,092,063; and 4,097,166. These patents are assigned to the assignee of the present invention.

Figure 1:
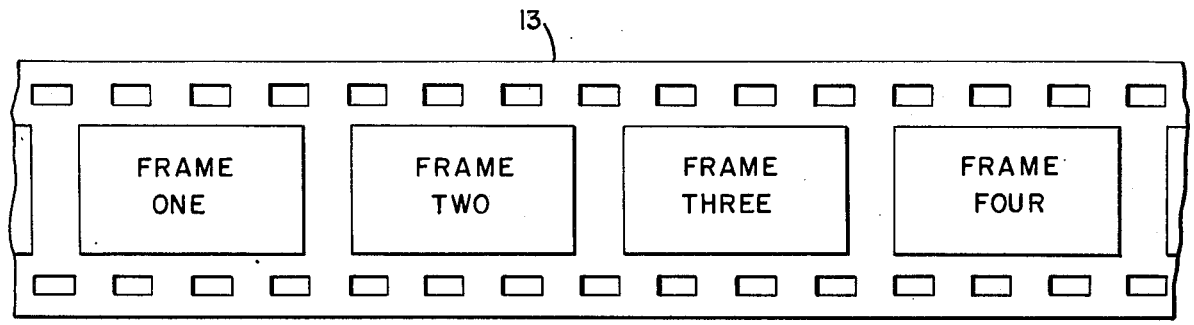
FIG. 1 is a schematic illustration of a filmstrip segment having four visual presentations thereon.

In accordance with the present invention the image bearing media may constitute the filmstrip 13 a segment of which is illustrated in FIG. 1. Four frames or images are illustrated and the filmstrip 13 typically includes sprocket holes for driving the filmstrip. FIG. 2 illustrates a segment of the magnetic tape 11 which is utilized in association with the filmstrip 13. A narrative is associated with each of the images on the filmstrip 13. For example a first narrative is associated with the image on the first frame, a second narrative with the image on the second frame, a third narrative with the image on the third frame etc. Superimposed upon or located between the narratives are recorded cue tones 15. When the system is synchronized, the narrative heard by the operator corresponds to the image being projected. For example, assume that the image in frame one is projected onto the screen 18. At this time narrative No. one is heard by the operator. Once the first narrative has been completed the appearance of the subsequent cue tone 15 is detected which causes the filmstrip 13 to be advanced to frame two after which the second narrative is heard by the operator. The system will continue to operate in synchronism until the end of the audio-visual program.

Assume now that the magnetic tape 11 is located at the second narrative and that the image on frame two is projected on the screen 18. If the operator depresses the film forward push button 30 two successive times, the image projected will be the image in frame four. As will be seen from a perusal of FIG. 2, it is now necessary to advance the magnetic tape 11 thru two cue tones 15 in order to synchronize the fourth narrative with the image projected from frame four. In accordance with the present invention, a count is maintained of the number of cue tones 15 that separate synchronization of the projected image and the associated narrative on the magnetic tape 11. This count is utilized to illuminate the appropriate rewind 50 or forward 52, and play 54 light emitting diodes to indicate to the operator in which direction the magnetic tape 11 must be moved to regain synchronization with the projected image. When the magnetic tape 11 is so moved, the resulting cue tones 15 produced are counted and the magnetic tape 11 automatically stopped when the narrative is again in synchronism with the projected image.

Assume now that the projected image corresponds to the image in frame four and that the magnetic tape 11 is positioned at the fourth narrative. Assume further that the operator by two subsequent depressions of the film reverse push button 32 causes the projected image to be that of frame two. As in the previous example the filmstrip 13 has been moved two frames. However, as is shown by a perusal of FIG. 2, moving the magnetic tape 11 in a reverse direction thru two cue tones 15 causes the magnetic tape 11 to be positioned at the end of the second narrative rather than at the beginning of the second narrative. Accordingly, whenever it is necessary to move the magnetic tape 11 in a reverse direction to regain synchronization with the projected image it is necessary to move the magnetic tape 11 thru one additional cue tone 15 to synchronize the magnetic tape 11 with the projected image. Assume that this has been done and that the magnetic tape 11 is positioned just prior to the cue tone 15 preceding the second narrative and that the image on frame two of the filmstrip 13 is being projected. As will be apparent to those skilled in the art when the system is placed in the play mode the cue tone 15 preceding the second narrative is detected to cause the filmstrip 13 to be advanced to the third frame. As will now be apparent, not only is it necessary to move the magnetic tape 11 an additional distance to generate one additional cue tone when moving the magnetic tape 11 in a reverse direction to regain synchronization, but it is also necessary that the first cue tone 15 that is detected once the system has been placed in the play mode not advance the filmstrip 13. In accordance with the present invention, the additional cue tone 15 is automatically produced when the magnetic tape 11 is moved in a reverse direction to regain synchronization by moving the magnetic tape to the next cue tone 15 and the first cue tone produced when the system is subsequently placed in the play mode does not advance the filmstrip 13.

Rather than moving filmstrip 13, synchronization between the audio program and the projected image can be lost by moving the magnetic tape 11 while the filmstrip 13 is stationary. The sound and the projected image, however, can be resynchronized in a manner as described hereinabove by moving the magnetic tape in a forward or in a reverse direction. Additionally, the synchronization can be lost by simultaneously moving the magnetic tape 11 and the filmstrip 13. By keeping a count, however, that is indicative of the number of cue tones 15 that separate synchronization of the projected image and its associated audio narrative and the direction in which the magnetic tape 11 must be moved to regain synchronization, synchronization of the sound and the projected image can be obtained as briefly described above and as described in detail hereinbelow.

Figure 4:
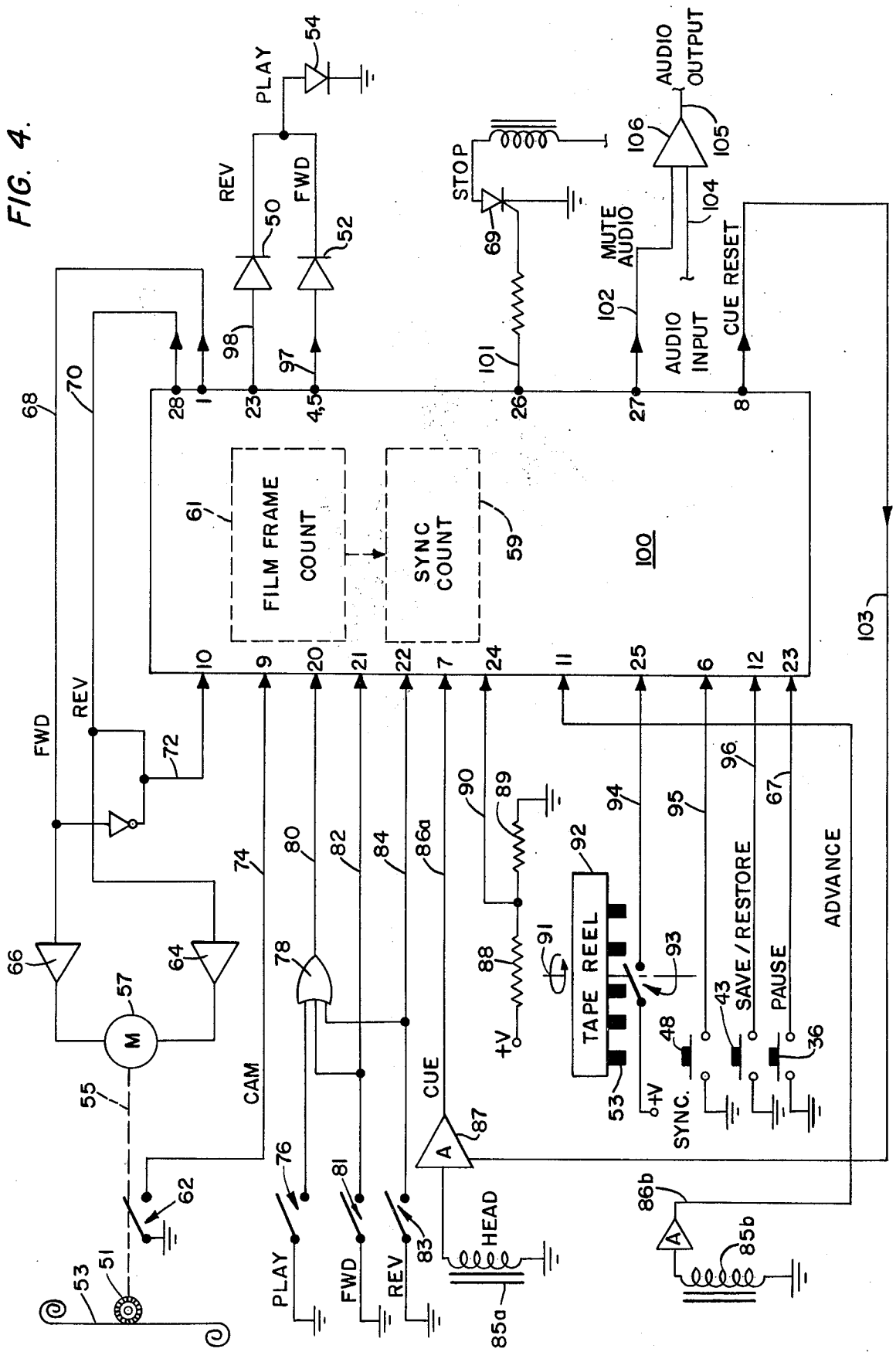
FIG. 4 is a functional block diagram which shows the microprocessor utilized in the present invention together with the various input and output connections to and from the microprocessor, respectively.

In accordance with the present invention automatic processing means are connected between the filmstrip projector and the magnetic tape transport to obtain resynchronization between the projected image and the associated audio program. Additionally, a Book-Mark feature is provided that enables the operator to mark an image frame which can be returned to at any future time. A logic diagram of the present invention is illustrated in FIG. 4 wherein a microprocessor 100 is illustrated. In accordance with one embodiment of the present invention which was constructed, the microprocessor 100 constituted a Rockwell PPS-4/1 MM75 processor, a PMOS LSI device which operates on 15 volts. The processor 100 is described in detail in the Rockwell PPS-4/1 Hardware Manual, Document No. 29480N10 the contents of which are incorporated herein by reference. The microprocessor 100 is programmed by means described hereinbelow to maintain a first count therein by means of a sync counter 59 that indicates the distance and direction the magnetic tape 11 must be moved to achieve synchronization with the projected image on the film 13. The sync counter 59 is reset to contain a count of zero when the magnetic tape 11 is synchronized with the projected image on the filmstrip 13. By means described below, the microprocessor 100 is also programmed to maintain a second count therein by means of a film frame counter 61 that indicates the number of frames and direction the film-strip 13 must be moved from its present position in order to project a reference image which can be selected by the operator. The film frame counter 61 is also reset to contain a count of zero when the image being projected is the reference or saved image.

As shown schematically in FIG. 4, the filmstrip 13 is driven in a forward or reverse direction by sprocketed driving means 51 which are connected to a drive motor 57 by any suitable mechanical driving means 55. Connected to the motor 57 are driving means 66 which, when active, cause the film 13 to be driven in a forward direction. Also connected to the motor 57 are driving means 64 which, when active, cause the motor 57 to drive the filmstrip 13 in a reverse direction. Driving means 64 and 67 are notoriously well known in the art and need not be described here in detail. When the driving means 66 is active to cause the filmstrip 13 to be moved in a forward direction the input on pin ten of the microprocessor 100 by way of an input lead 72 is low. A high signal on the input lead 72 indicates to the microprocessor 100 that the film 13 is being moved in the reverse direction by the motor 57 or that the film 13 is stopped. Each time the projected image on the filmstrip 13 is changed the filmstrip driving means 51, 55, 57, actuates a switch 62 which causes a film cam signal on input lead 74 to pin nine of the microprocessor 100 to be active low. Each active low signal on the lead 74, corresponding to movement of the film 13 thru the distance of one frame, causes the frame count 61 to be incremented or decremented by one. For example, if the film 13 is moved one frame in a forward direction the frame count is increased by one. Correspondingly, if the film 13 is moved in the reverse direction for one frame the frame count is decreased by one.

Actuation of the play key 44 of the tape transport causes actuation of a switch 76 which causes one input of an OR gate 78 to be active low. Actuation of the forward key 42 of the tape transport causes actuation of a switch 81 which causes another input of the OR gate 78 to become active low. Additionally, operator actuation of the reverse key 40 of the tape transport actuates a switch 83 to cause still another input to the OR gate 78 to be active low. Actuation of the reverse key 40 also causes the input to pin twenty two of the microprocessor 100 by way of input lead 84 to be active low whereas actuation of the forward key 42 causes the input to pin twenty one of the microprocessor 100 by way of input lead 82 to be active low. The input to pin twenty of the microprocessor 100 by way of the input lead 80, which constitutes the output of the OR gate 78, is active high whenever the play key 44, forward key 42 or reverse key 40 of the tape transport is actuated by the operator. As will now be apparent input leads 80 and 82 are active whenever the forward key 42 of the tape transport is actuated input leads 84 and 80 are active whenever the reverse key 40 of the tape transport is actuated and input lead 80 is active whenever the play key 44 of the tape transport is actuated. In accordance with one embodiment of the present invention which was constructed, the OR gate 78 constituted a mechanical characteristic of the tape transport unit utilized which is described hereinabove. As will be apparent to those skilled in the art, the OR gate 78 is not necessary since a single input to the microprocessor 100 for each of the tape transport keys 40, 42, and 44 would be sufficient.

In a manner as described in U.S. Pat. No. 4,121,263 incorporated herein by reference, the cue tones 15 on the magnetic tape 11 are detected by a magnetic reading head 85a when the system is operated in the fast forward or fast reverse mode of operation and amplified by an amplifier 87 as cue tone signals. These cue signals are applied to pin seven of the microprocessor 100 by way of a lead 86a. When the system is in the play mode of operation, the occurrence of a cue tone signal 15 is detected by magnetic reading head 85a and appears on input lead 86b to pin eleven of the microprocessor 100 and is utilized solely to advance the filmstrip 13 to project the next image. When a cue tone signal 15 appears on the lead 86a when the magnetic tape 11 is being moved in a fast forward or a fast reverse direction, however, the cue tone 15 signals are utilized to increment or decrement the count within the sync counter 59. For example, when the tape is moving in the fast forward direction the count in the sync counter 59 is incremented. When the magnetic tape 11 is moving in the reverse direction the count in the sync counter 59 is decremented. The sign of the number in the sync counter 59 indicated the direction in which the magnetic tape 11 must be moved in order to regain synchronization with the projected image. The magnitude of the count within the sync counter 59 indicates the number of cue tone signals that must be produced by movement of the magnetic tape 11 to regain synchronization with the projected image on the filmstrip 13. In addition to being incremented and decremented by the cue tone signals 15 appearing on the input lead 86a the sync counter 59 is also incremented and decremented by the film cam signals appearing on input lead 74 provided that the magnetic tape 11 is being operated in the fast/forward or fast/reverse direction or that the tape transport apparatus is not in the play mode of operation. The direction in which the sync counter is 59 is changed by the occurence of the cam signals on the lead 74 is determined by the film motor 57 direction as indicated by the film motor input on lead 72. The count within the sync counter 59 is increased as the film 13 is moved further away from synchronization and decreased as it is moved nearer to synchronization with the magnetic tape 11.

The initial application of power to the system is sensed by way of the input lead 90 which is connected to pin twenty-four of the microprocessor 100. The application of power can be sensed by connecting a suitable voltage divider across the output of the power supply, which may constitute series connected resistor 88 and 89 with input lead 90 being connected to the junction thereof. Once the microprocessor 100 has sensed the initial application of power it will automatically reset the film frame counter 61 and the sync counter 59 as well as inactivating the various outputs described hereinbelow.

A take up reel 92 for the magnetic tape 11 is illustrated in FIG. 4 as being rotatable around a vertical axis 91. In accordance with the present invention the takeup reel 92 includes a plurality of projections 53 depending therefrom that periodically close a switch 93 as the takeup reel is rotated. Periodic actuation of the switch 93 causes a changing DC level to be applied to pin twenty-five of the microprocessor 100 by way of the input lead 94. By sensing the time interval of the voltage level appearing on lead 94, the microprocessor 100 can detect when the end of the magnetic tape 11 has been reached. This is so because when the end of the magnetic tape 11 occurs the takeup reel 92 no longer rotating and the microprocessor 100 will detect that the voltage level on lead 94 has not changed during the course of a predetermined time interval. In a like manner the microprocessor 100 can determine when a break in the magnetic tape 11 occurs during the rewind mode of operation. The occurence of a voltage level for the predetermined time period results in the microprocessor 100 actuating a stop solenoid 63 as described hereinbelow. The microprocessor 100 however, will ignore the unchanging voltage level on the input lead 94 if the pause key 36 is depressed and also for the first two hundred fifty to seven hundred fifty milliseconds after the pause key 36 is released.

Operator actuation of the sync push button 48 causes the input lead 95 to pin six of the microprocessor 100 to be active low and indicates to the microprocessor 100 that the magnetic tape 11 and the filmstrip 13 are synchronized. The active low sync signal results in the sync counter 59 being reset to zero.

Operator actuation of the save/restore push button 43 causes the input to pin twelve of the microprocessor 100, by way of input lead 96, to become active low. When this input is low while the system is in the play mode of operation the then projected film image will be remembered by the microprocessor 100 by resetting the frame counter 61 to zero. This enables an operator to save or reference a projected image which may be returned to at a later time. While the save/restore push button 43 is depressed the adjacent light emitting diode 45 (FIG. 3) is illuminated. If the save/restore push button 43 is actuated while the magnetic tape 11 is not moving, the microprocessor 100 will cause the filmstrip 13 to be moved to the saved or referenced image location in a manner as described hereinbelow in detail.

In the embodiment of the present invention described herein, however, when the save/restore push button 43 is actuated while the magnetic tape 11 is not moving as a result of actuation of the pause push button 36, the then projected film image will be remembered by the microprocessor 100 by resetting the frame counter 61 to zero.

Operator actuation of the pause push button 36 causes the input to the microprocessor 100 on pin twenty-three by way of the lead 67 to become active high. When this lead 67 is active and the system is operating in the play mode of operation, operating voltage will be removed from the magnetic tape 11 transport drive motor (not shown) to stop the magnetic tape 11. However, if input lead 67 becomes active while the tape transport is in the fast/forward or fast/reverse mode of operation, the magnetic tape 11 will be automatically stopped by actuation of the stop solenoid 63 discussed below.

Pin one of the microprocessor 100 is coupled to the forward driving means 66 of the filmstrip drive motor 57 by way of a lead 68. The microprocessor 100 will make this line 68 active high to advance the filmstrip drive motor 57. This signal remains active high until the film cam input on lead 74 causes the count within the film frame counter 61 to become zero which indicates that the saved position on the film-strip 13 has been reached. Pin twenty-eight of the microprocessor 100 is connected to the reverse driving means 64 of the motor 57 by way of an output lead 70. The microprocessor 100 will make the output on lead 70 active high whenever the filmstrip 13 is to be moved in a reverse direction and remains high until the film cam input on lead 74 causes the count in the film frame counter 61 to become zero which indicates that the saved position on the filmstrip 13 has been reached.

When the magnetic tape 11 must be moved in a reverse direction to regain synchronization with the projected image, the microprocessor 100 will make the output lead 98 active high to turn on the light emitting diode 50 located below the tape transport rewind key 40 and to turn on the light emitting diode 54 which is located below the play key 44 of the magnetic tape transport. Output lead 98 is connected to pins 2 and 3 of the microprocessor 100 to provide sufficient current to drive the light emitting diodes 50 and 54. When the magnetic tape 11 must be moved in the forward direction to regain synchronization with the projected image, the microprocessor 100 will make output lead 97 active high which turns on the light emitting diode 54 located below the play key 44 of the magnetic tape transport and also turns on the light emitting diode 52 located below the forward key 42 of the magnetic tape transport. Output lead 97 is connected to pins four and five of the microprocessor 100.

By making output lead 101 active high the microprocessor 100 actuates an SCR 69 which in turn actuates a stop solenoid 63. Operation of the stop solenoid 63 actuates the stop key 38 mechanism of the tape transport to stop the magnetic tape 11. The microprocessor 100 activates line 101 whenever the count within the sync counter 59 becomes zero indicating that synchronism has been obtained between the audio program and the projected image while the magnetic tape is moving in a fast forward or a fast reverse direction. Output lead 101 is also activated whenever the input to the microprocessor 100 on lead 94 indicates that the end of the magnetic tape 11 has been reached or that the magnetic tape 11 has been broken during rewind. Output lead 101 is connected to pin twenty-six of the microprocessor 100.

The amplification of the sound track of the magnetic tape 11 transport unit is schematically illustrated in FIG. 4 by an audio amplifier 106 having an audio input on lead 104 and an amplified audio output on lead 105. Also connected to the audio amplification portion of the magnetic tape transport unit is output lead 102 of the microprocessor 100 which is connected to pin twenty-seven. By making output lead 102 high the microprocessor 100 eliminates or mutes the audio output from the magnetic tape transport unit. This takes place while the magnetic tape 11 is driven in the fast/forward or fast/reverse directions or while the microprocessor 100 waits for the occurrence of the first cue tone following fast reverse movement of the magnetic tape 11 to achieve synchronization between the projected image and the audio program.

In U.S. Pat. No. 4,121,263 incorporated herein by reference, apparatus is described for separating the cue tones 15 from the audio program on the magnetic tape 11. One characteristic of this apparatus is an electrical time constant which persists for a limited period of time after a cue tone 15 has been detected. In order to reduce this time constant to a minimum, the microprocessor 100 provides a cue reset output on output lead 103 which is coupled to the cue tone separating apparatus 87. This output is made active high for a limited time, such as twenty-five to seventy-five milliseconds following the trailing edge of each detected cue tone 15. When high, this signal is utilized by the cue tone separating apparatus 87 to turn on a transistor (not shown) to discharge a capacitance (not shown within the apparatus 87 to decrease the time constant associated therewith. Output lead 103 is connected to pin eight of the microprocessor 100.

Refer now to FIGS. 1, 2, 3 and 4 assume that an operator has loaded the apparatus with a magnetic tape 11 and a filmstrip 13. Assume further that frame one of the filmstrip is projected onto screen 18 and that the magnetic tape 11 is located at the beginning of the first narrative. When power was first applied to the apparatus the film frame counter 61 and the sync counter 59 were reset to zero in a manner described hereinabove. However, the operator normally presses the sync push button 48 after loading the filmstrip 13 and magnetic tape 11 and positioning both to the first location to reset the sync counter 59. Operator depression of the tape transport play key 44 will cause forward movement of the magnetic tape 11 thereby enabling the operator to hear the narrative associated with the image in frame one. Upon completion of the first narrative the first cue tone 15 is sensed to cause the filmstrip 13 to be moved one frame forward. This is accomplished by the microprocessor 100 activating the output line 68 in response to the first advance pulse appearing on the input lead 86b while in the play mode of operation. Forward movement of the filmstrip 13 from frame one to frame two causes the count within the film frame counter 61 to be incremented from zero to a count of 1. Since the system is in the play mode of operation, the occurrence of the first cue tone signal 15 on the input lead 86 has no affect on the count within the sync counter 59 which remains at zero. As long as the magnetic tape 11 remains in synchronization with the filmstrip 13 the count within the sync counter 59 will remain zero and the count within the film frame counter 61 will be incremented each time the filmstrip 13 frame is moved forward one frame.

Assume now that the image in frame two is projected onto the screen 18 and that the magnetic tape 11 is located at the second narrative i.e., the magnetic tape 11 and filmstrip 13 are synchronized. If the system is not in the play mode of operation and the filmstrip 13 is advanced to the image apearing in frame four by two sequential depressions of the film forward push button 30, the magnetic tape 11 will remain at the second narrative while the image in frame four is projected. The magnetic tape 11 and the filmstrip 13 are now unsynchronized. When the filmstrip 13 was moved forward two frames while the system was not in the play mode the film cam signals appearing on input lead 74 caused the count within the sync counter 59 to be incremented from zero to a count of two. The two film cam signals appearing on input lead 74 also cause the count within the film frame counter 61 to be incremented by two from a count of one to a count of three. The count of three in the film frame counter 61 indicates that the filmstrip 13 must be moved in a reverse direction three frames in order to arrive at the starting point i.e., frame one. The count of two in the sync counter 59 indicates that the magnetic tape 11 must be moved forward a distance that generates two cue tone signals 15 on input lead 86 in order for the magnetic tape 11 to be synchronized with the projected image on frame four. For example, reference to FIG. 2 shows that to arrive at the fourth narrative from the second narrative requires traversing the magnetic tape 11 thru two cue tones 15. When the count in the sync counter 59 is other than zero the microprocessor 100 will activate the light emitting diodes 50 or 52 and 54 indicating to the operator the direction in which the magnetic tape 11 must be moved to region synchronization between the projected image and the audio program. In this instance output lead 97 will be made activate to turn on the light emitting diode 52 located beneath the forward key 42 of the type transport and the light emitting diode 54 located below the play key 44. This indicates to the operator that the magnetic tape 11 must be moved forward to regain synchronization with the projected image. Accordingly, by depressing both the play 44 key and forward 42 key the magnetic tape 11 is moved in a forward direction. As the cue tone 15 between the second and third narrative is sensed the count within the sync counter 59 is reduced by one to a count of one. At the occurrence of the cue tone 15 between the third and fourth narrative the count within the sync counter 59 is reduced by a count of one to a count of zero. When the count within the sync counter 59 becomes zero the microprocessor 100 activates the output lead 101 to actuate the stop solenoid to stop the magnetic tape 11 at the beginning of the fourth narrative. Additionally, when the count within the sync counter 59 becomes zero the microprocessor 100 causes the output lead 97 to become inactive to extinguish the light emitting diodes 52 and 54. At this point the sound has been resynchronized with the image being projected at frame four. Although the count within the sync counter 59 is zero, the count within the film frame counter 61 remains at a count of three which indicates that the filmstrip 13 has been moved three frames from the beginning or first frame. By depressing the play key 44 on the tape transport the system will continue with the sound and projected image in synchronization.

Assume now that the image in frame four is being projected, that the magnetic tape 11 is located at the fourth narrative, and that the system is not in the play mode of operation. By two consecutive actuations of the film reverse push button 32, the filmstrip 13 can be moved in a reverse direction to project the image in frame two. The two resulting cam signals appearing on input lead 74 cause the count within the film frame counter 61 to be decremented by two from a count of three to a count of one. The two film cam signals appearing on line 74 cause the count in the sync counter 59 to be decremented from a count of zero to a count of minus two. The negative count within the sync counter 59 will cause the microprocessor 100 to activate the output lead 98 which turns on the light emitting diode 50 located below the rewind key 40 and the light emitting diode 54 located below the play key 44. Operator actuation of the rewind key 40 and the play key 44 will result in the magnetic tape 11 being moved in the reverse direction. When the cue tone signal 15 located between the third and fourth narratives occurs on input lead 86 the count within the sync counter 59 will be incremented to a count of minus one while the count within the frame counter 61 remains the same. In a similar manner when the cue tone between the second and third narrative is sensed and appears as a signal on input lead 86 the count within the sync counter 59 will be incremented to a count of zero while the count within the film frame counter 61 remains unchanged. However, since the magnetic tape 11 is being moved in a reverse direction as evidenced by the signal on input lead 84, the microprocessor 100 will wait until one more cue tone 15 is sensed before stopping the magnetic tape 11. When the cue tone 15 between the first and second narrative is sensed the count within the sync counter 59 is incremented to a count of 1. At this time the output lead 98 is made inactive to turn off the light emitting diodes 50 and 54 at the same time the output lead 101 is made active to actuate the stop solenoid 63 to stop the magnetic tape 11. At this instant the image in frame two is being projected and the magnetic tape is located between the first narrative and the following cue tone 15. When the operator depresses the play key the sync counter 59 will have been reset to zero and the output of lead 102 will be active to mute the audio picked up from the magnetic tape 11 until after the cue tone 15 following first narrative is sensed. Additionally, the first cue tone 15 following the first narrative is ignored by the microprocessor 100 such that the filmstrip 13 is not advanced one film frame in response thereto. Accordingly, when the magnetic tape 11 is located at the beginning of the second narrative the sound heard by the operator is in synchronism with the image being projected from frame two. The count within the sync counter 59 is now zero whereas the count in the film frame counter 61 is still a count of one which indicates that the projected image is located one frame away from the beginning or reference image. The end of tape signal (not shown) which is located prior to the first narrative functions as a cue tone signal whenever the magnetic tape 11 is resynchronized with the image in the first film frame.

In the example given the filmstrip 13 was moved out of synchronization from the magnetic tape 11. When the apparatus is not in the play mode and when the magnetic tape 11 is moved out of synchronization from the filmstrip 13 by being moved in the fast/forward or fast/reverse direction by depressing the forward key 42 and rewind key 40 respectively, the cue tone signals 15 produced on the input lead 86 cause the count within the sync counter 59 to be incremented or decremented such that the count and the sign thereof indicates which direction the magnetic tape 11 must be moved to regain synchronization with the projected image as described hereinabove. In one embodiment of the present invention which was constructed, the cue tones 15, on the magnetic tape 11 could only be sensed when the magnetic tape 11 was moved in a fast/forward or fast/reverse direction if the play key 44 of the tape transport was also depressed. As will be apparent to those skilled in the art, a magnetic tape transport may be utilized with the present invention that does not require depression of the play key 44 together with the fast/forward 42 or fast/rewind 40 in order to detect the cue tones 15 on the magnetic tape 11.

As shown in FIG. 3, the light emitting diodes 50 and 52 are located above and generally in line with the forward and reverse push buttons 30 and 32, respectively, that control the filmstrip 13. When illuminated, accordingly, the light emitting diodes 50 and 52 indicate the direction in which the filmstrip 13 must be moved to regain synchronization with the sound on the magnetic tape 11. When the projected image and sound are out of synchronization, actuation of the indicated pushbutton 30 or 32 will, as described above, result in the count within the sync counter 59 being decreased toward zero as the filmstrip 13 is moved toward synchronization with the magnetic tape 11. Once synchronization is obtained, the illuminated light emitting diode 50 or 52 will be turned off. Accordingly, synchronization is obtained by moving either the magnetic tape 11 or the filmstrip 13 as indicated by the light emitting diodes 50 and 52.

As is apparent from the description set forth hereinabove, the count within the film frame counter 61 and its sign is an indication of the number of frames and the direction in which the filmstrip 13 must be moved to return to a reference or saved image. In the example given above the reference image was the first frame of the filmstrip 13. However, when the system is in the play mode of operation and the save/restore push button 43 is depressed, causing the signal on input lead 96 to become active, the count within the film frame counter 61 is reset to zero thereby causing the then projected image on the filmstrip to be the reference or saved image. Any subsequent movement of the filmstrip 13 will increment or decrement the film frame counter 61 such that the count therein together with its sign indicates the direction and the number of frames the filmstrip 13 must be moved in order to return to the saved image. The operator can return the system to the saved image and have the sound program synchronized therewith merely by again depressing the save/restore push button 43 while the magnetic tape 11 is not being moved. So depressing the save/restore push button 43 indicates to the microprocessor 100 that the operator desires to return to the saved image. In order to accomplish this the count within the frame counter 61 is algebraically added to the count, in the sync counter 59. The count within the sync counter 59 and its sign now indicate which direction and how far the magnetic tape 11 must be moved to regain synchronization with the saved image. Accordingly, the appropriate light emitting diodes 50 or 52 and 54 are activated by the microprocessor 100. Operator actuation of the indicated tape transport keys causes the magnetic tape 11 to be moved toward syncrhonization with the saved image. As being moved in a manner as discussed hereinabove, the cue tone signals 15 appearing on the input lead 86a will cause the count within the sync counter 59 to approach zero. When the count within the sync counter 59 does become zero and the tape 11 is moving forward the stop solenoid 63 is actuated to stop the magnetic tape 11. If it is necessary to move the magnetic tape 11 in a reverse direction to regain synchronization with the saved image, the magnetic tape will be moved in the reverse direction one additional cue tone 15, in a manner as described hereinabove, with the subsequent muting of the audio until the desired narrative is reached. While the appropriate tape transport keys 40 or 42 and 44 must be operator actuated to begin moving the magnetic tape 11 into synchronization with the saved image, such is not the case for the movement of the filmstrip 13. The microprocessor 100, in response to the input lead 96 becoming active when the system is not in a magnetic tape 11 movement operation, will cause either the output lead 68 or the output lead 70 to become active depending upon the sign of the count within the film frame counter 61 so as to move the filmstrip 13 in a direction toward the saved image. As the filmstrip 13 is being so moved the cam signals appearing on input lead 74, generated by movement of filmstrip 13, will cause the count within the frame counter 61 to approach zero. When the zero count is reached the film drive output on lead 68 or 70 will be inactivated by the microprocessor 100 and the filmstrip 13 will project the saved image. At this point the filmstrip 13 is again synchronized with the audio program on the magnetic tape 11. As will be apparent from the above, the save/restore push button 43 functions, when depressed, to cause the then projected image to be the saved image when the system is in the play mode of operation. When the magnetic tape 11 is not being moved, however, and the saved/restore push button 43 is operator actuated, the system is directed to return to the saved image. If there is no operator selected reference or saved image at the time that the save/restore push button 43 is actuated and the magnetic tape 11 is not moving, the system will return to the image which was projected at the time that the power was turned on and the film frame counter 61 reset to zero.

When the filmstrip 13 is being returned to the saved image the film cam signals appearing on the input lead 74 have no effect on the count within the sync counter 59. As will be apparent from the above description, the magnetic tape 11 does not need to be in synchronism with the filmstrip 13 at the time the system is directed to return to the saved image. This is so because the count in the film frame counter 61 is algebraically added to the count, if any, in the sync counter 59 such that the resulting count indicates the distance the magnetic tape 11 must be moved to regain synchronization with the saved image. Once returned to the saved image and reset to zero the film frame counter will again be incremented and decremented as the filmstrip 13 is moved therefrom in a forward or reverse direction. Accordingly the system will remember the saved image position. This enables the operator to repeatedly return to the once marked reference image without marking that position each time. Since the count within the film frame counter 61 is maintained independently of the count within the sync counter 59, the operation of the save/restore function described above is not affected in any way by operator depression of the sync push button 48. If the save/restore push button 43 is depressed while the system is being returned to the saved image due to a previous depression of the save/restore push button, the filmstrip 13 and magnetic tape 11 are stopped. If the save/restore push button 43 is depressed again, the system will again return to the saved image. This provides an operator with a means of stopping the system if the save/restore push button 43 is accidentally depressed.

The microprocessor 100 is enabled to perform the monitoring and control functions described hereinabove due to a program contained therein that is illustrated by means of a flow chart in FIGS. 5A, 5B and 5C. The program constitutes a single loop which considers in turn each input that requires action to be taken and checks internal software timers which control output signal times. A rewind flag is utilized by the program to provide the feature that permits the magnetic tape 11 to be moved an additional cue tone 15 position when it is being moved in the fast/reverse direction. This flag also permits the microprocessor 100 to ignore the first cue tone signal 15 following the reverse movement of the magnetic tape 11. The program also utilizes a restore flag which is used when the operator has initiated movement of the filmstrip 13 to the saved image.

Figure 5A:
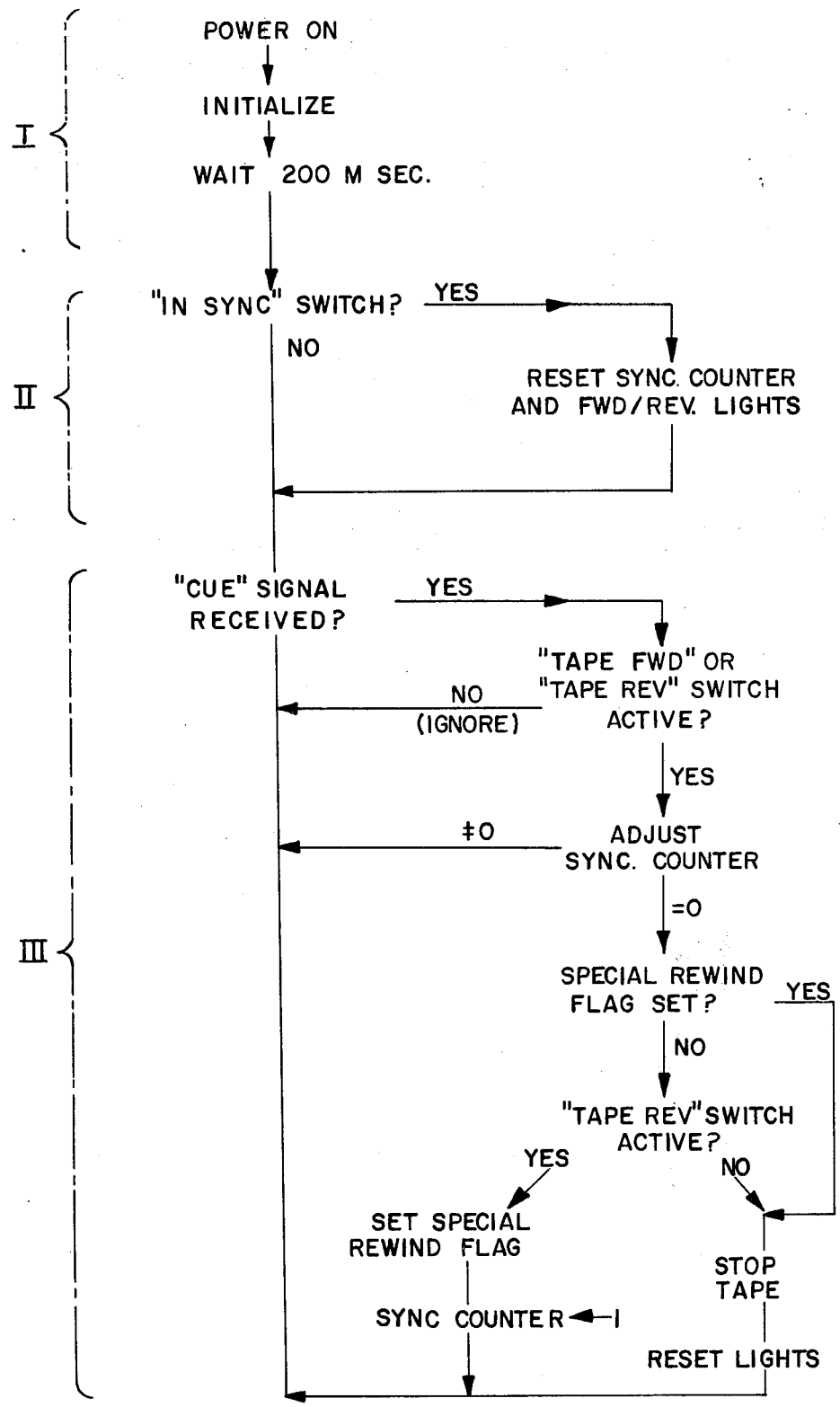

The portion of the program identified in FIG. 5A by the roman numeral I describes that portion of the program which initializes or resets the various registers including the film frame counter 61 and the sync counter 59, resets the flags and waits a predetermined time for the system to stabilize electrically. The portion identified by roman numeral II describes the portion of the program which responds to operator actuation of the sync push button 48. The presence of this signal causes the sync counter 59 to be reset to zero and the light emitting diodes 50 or 52 and 54 to be turned off. The roman numeral III identifies that portion of the program which is responsive to the cue tone signals 15 appearing on the input leads 86a and 86b. These signals will be allowed to advance the filmstrip 13 to the next image frame if the magnetic tape 11 is not moving in the fast/forward or fast/reverse direction. If the magnetic tape 11 is so moving, however, the cue tone signals 15 will be utilized to adjust the count within the sync counter 59. If the sync counter 59 becomes zero and the special rewind flag is set an additional cue tone signal 15 will be detected before stopping the magnetic tape 11 and extinguishing the light emitting diodes 50 or 52 and 54. However, if no rewind flag is set and the tape is not moving in the reverse direction the magnetic tape 11 will be stopped when the count within the sync counter becomes zero. In the absence of the rewind flag, but with the tape moving in the reverse direction, the rewind flag will be set to enable the sync counter ro count an additional cue tone after being set to zero in a manner as described hereinabove.

Figure 5B:
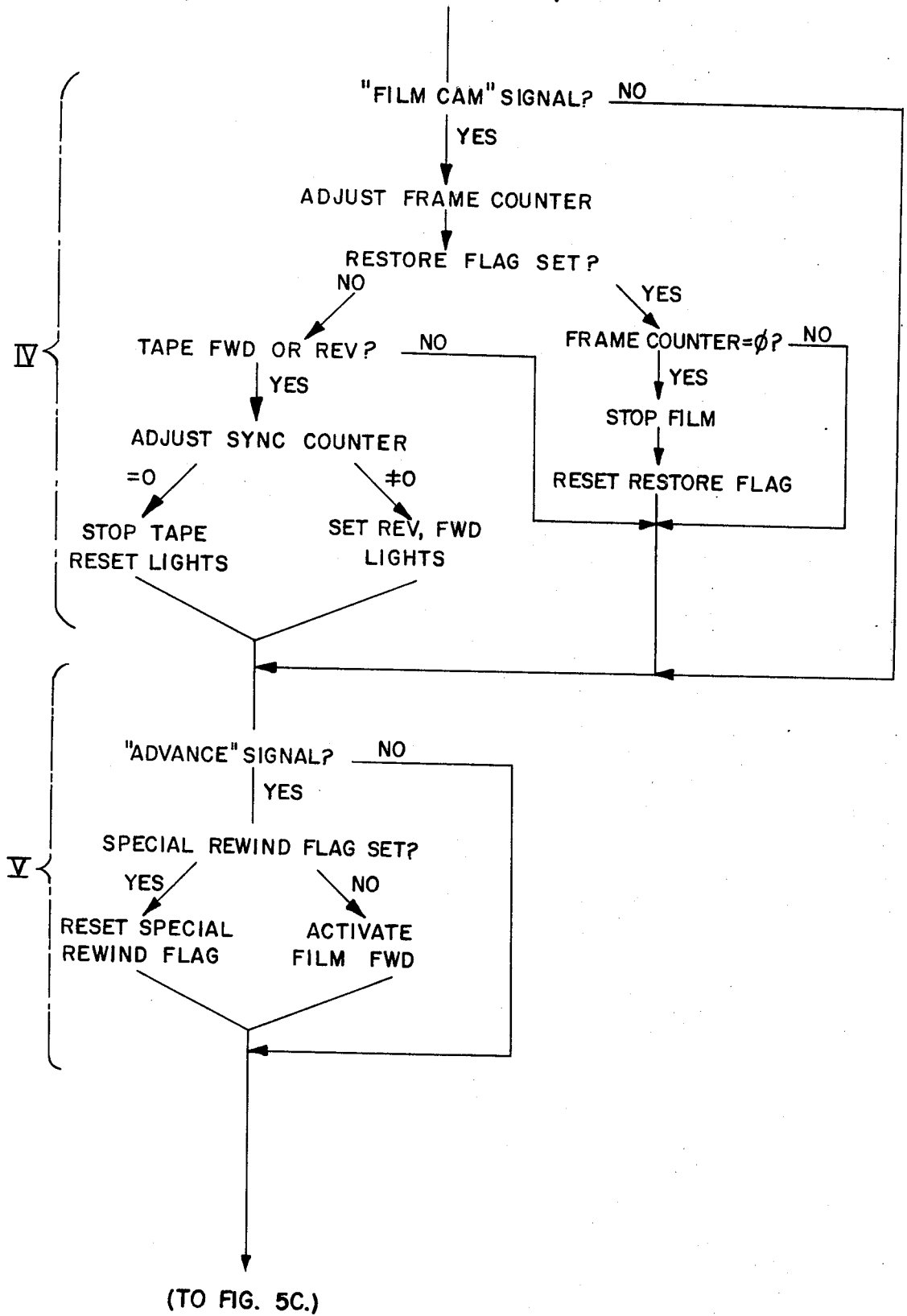

The portion of the program identified in FIG. 5B by roman numeral IV describes that portion of the program that is responsive to the receipt of a film cam signal on the input lead 74. Each appearance of this signal indicates that the filmstrip 13 has been moved one frame and causes the frame counter 61 to be incremented or decremented by one count depending upon the film direction signal appearing on input lead 72. If the system is not in the play mode of operation and the filmstrip 13 is not being automatically restored to the reference or saved image each occurrence of the film cam signal on the input lead 74 also will increment or decrement the sync counter 59 depending upon the direction of movement of the filmstrip 13. If this results in the count within the sync counter 59 becoming zero the magnetic tape 11 is automatically stopped by the microprocessor 100 actuating the stop solenoid 63 in a manner as described above. The portion of the program identified by roman numeral V describes that portion of the program that responds to the occurrence of a cue tone signal 15 when the system is in the play mode of operation and results in the filmstrip 13 being advanced by one frame. If the rewind flag is set the magnetic tape 11 has just been moved in the reverse direction and the first cue tone 15 detected will be ignored by the microprocessor 100 and the filmstrip 13 will not be advanced one frame.

The portion of the program identified by roman numeral VI in FIG. 5C describes the save/restore portion of the program. As shown, if the magnetic tape 11 is moving in the play mode when the save/restore push button 43 is actuated the then projected image is saved, or caused to be the reference image, by resetting the frame counter 61 to zero. If the magnetic tape 11 is not moving at the time, a return to the saved image is initiated. This is accomplished by algebraically adding the count within the film frame counter 61 to the count within the sync counter 59. The count within the sync counter 59 is utilized to indicate to the operator the direction in which the magnetic tape 11 must be moved to regain synchronization with the saved image. The count within the film frame counter, on the other hand, is utilized by the microprocessor 100 to automatically restore the filmstrip 13 to the saved image. The portion of the program identified by roman numeral VII describes the system response to the presence of the pause signal. When present the magnetic tape 11 is stopped by means of the stop solenoid 63 if it is moving in the fast forward or fast reverse direction. This portion of the program also measures the time duration of the signals appearing on the input lead 94 from the take-up reel 92 to check for the beginning of the tape 11, the end of the tape 11 of a broken tape 11 during rewind. If any of these tape 11 conditions occur the magnetic tape 11 is automatically stopped by actuation of the solenoid 63. The portion of the program identified by roman numeral VIII describes the muting of the audio output of the magnetic tape 11 just after the magnetic tape has been moved in a reverse direction to obtain resynchronization of the projected image with the audio program.

The program described in the flow charts illustrated in FIGS. 5A, 5B and 5C is described in detail in the program listing which is appended hereto and made a part of this specification. The program listing comprises four columns with the first or left most column being the instruction label, the next column being the instruction operator, the next column being the instruction operand and the last and right most column being the instruction comment. The symbols and codes utilized in the program listing will be readily understood by reference to the Rockwell PPS-4/1 microprocessor Programming Manual, Document No. 29410-N38 the contents of which are incorporated herein by reference.

As will be apparent from the detailed description setforth above, the present invention may also be utilized with a slide projector in place of the filmstrip projector.

Other embodiments and modifications of the present invention as described will be apparent to those skilled in the art without departing from the spirit and scope of this invention as defined by the following claims.

What is claimed is:

1. Aparatus for regaining synchronization between a series of image presentations and an audio accompaniment therefor recorded on a magnetic tape and having associated cue tones recorded thereon comprising:

a projector for projecting a series of said images;

said projector including image bearing means and means for moving said image bearing means through said projector in a forward and reverse direction to change the projected image;

said projector including means for providing a pulse signal each time a projected image is changed by moving said image bearing means in a forward or reverse direction;

tape transport means for said magnetic tape and including means for separating said cue tones from said audio accompaniment as said tape is moved in a fast forward or a fast reverse direction; and automatic processing means coupled between said projector and said tape transport means;

said processing means including means for receiving the pulse signals indicative of said image changes and the cue tones from said fast moving tape for algebraically keeping a first count therein that is indicative of the synchronization, or distance and direction to synchronization, between said projected images and the audio accompaniment on said magnetic tape;

said first count being indicative of the number of cue tones to be produced by moving said magnetic tape to regain synchronization between said projected images and said sound;

said tape transport including means to enable said magnetic tape to be moved in a fast forward direction to produce a number of cue tones equal to said first count to regain synchronization between said images and said sound;

said tape transport and said processing means including means to enable said magnetic tape to be moved in a fast reverse direction to automatically produce a number of cue tones that is greater than said first count by a predetermined amount to regain synchronization between said images and said sound;

said processing means including means for automatically causing said tape transport to stop said magnetic tape when it is moved in the fast forward direction to produce said number of cue tones equal to said first count and for automatically causing said tape transport to stop said magnetic tape when it is moved in the fast reverse direction to produce said number of cue tones that is greater than said count.

2. The apparatus according to claim 1 wherein said tape transport includes means for producing electrical signals that indicate whether said magnetic tape is moving in the fast forward direction or the fast reverse direction;

said processing means being coupled to said tape transport to receive said signals indicative of the fast forward or fast reverse direction of movement said magnetic tape; and said first count being indicative of the direction said magnetic tape must be moved to regain synchronization between said images and said sound.

3. The apparatus according to claim 2 wherein said first count is positive when said magnetic tape must be moved in a forward direction to regain synchronization and said first count is negative when said magnetic tape must be moved in a reverse direction to regain synchronization.

4. The apparatus according to claim 1 wherein said image bearing means includes a filmstrip and said projector further includes means for producing an electrical signal that is indicative of the direction said filmstrip is moved; and said processing means being coupled to said projector to receive said signal indicative of the direction of movement of said filmstrip.

5. The apparatus according to claim 1 wherein said tape transport includes visual means to indicate to an operator the direction in which said magnetic tape must be moved to regain synchronization between said images and said tape; and said processing means being coupled to said visual means and operable to actuate said visual means in response to said first count.

6. The apparatus according to claim 1 wherein said processing means includes manually operable means coupled thereto for resetting said first count therein so that said first count indicates synchronization between said projected image and said sound.

7. The apparatus according to claim 1 wherein said processing means is adapted to receive said pulse signals indicative of said image changes to provide a second count therein that indicates the number of images changes, if any, that separate a current projected image from a reference image on said image bearing means;

said processing means having an output coupled to said projector for controlling said means for moving said image bearing means;

said processing means being selectively responsive to said second count to cause said means for moving said image bearing means to move said image bearing means to a position where said reference image is projected.

8. The apparatus according to claim 7 wherein said first count indicates the direction and distance said image bearing means must be moved to regain synchronization between said projected reference image and said sound.

9. The apparatus according to claim 7 wherein said second count indicates the number of pulse signals to be produced by moving said image bearing means to project said reference image and also indicates the direction said image bearing means must be moved to project said reference image.

10. The apparatus according to claim 9 wherein said second count is positive when said image bearing means must be moved in a forward direction to project said reference image and is negative when said image bearing means must be moved in a reverse direction to project said reference image.

11. The apparatus according to claim 9 wherein said projector includes means for providing a signal that indicates whether said image bearing means is moving in a forward or a reverse direction;

said processing means being adapted to receive said signals indicative of the direction of movement of said image bearing means.

12. The apparatus according to claim 11 wherein said processing means is made selectively responsive to said second count therein by first manually actuatable means coupled to said processing means.

13. The apparatus according to claim 12 wherein said processing means includes second manually actuatable means coupled thereto for resetting said second count therein whereby the then projected image on said image bearing means is caused to become said reference image.

14. The apparatus according to claim 9 wherein said processing means selectively responsive to said second count also causes said second count to be algebraically added to said first count at the time said processing means is selected to be responsive to said second count to enable said tape transport means to synchronize said sound with said reference image.

15. The apparatus according to claim 14 wherein said tape transport means causes said magnetic tape to be moved in a forward direction to produce a number of cue tones equal to the algebraic sum of said first count and said second count to synchronize said sound with said reference image.

16. The apparatus according to claim 14 wherein said tape transport means causes said magnetic tape to be moved in a reverse direction to automatically produce a number of cue tones that is greater than the algebraic sum of said first count and said second count by a predetermined amount to synchronize said sound with said reference image.

17. Apparatus for regaining synchronization between a series of image presentations and an audio accompaniment therefor that is recorded on a magnetic tape having associated cue tones recorded thereon comprising:
a projector including image bearing means and means for moving said image bearing means in said projector in a forward and in a reverse direction to change the projected image;
said projector including means for producing a first signal that indicates whether said image bearing means is moving in a forward or reverse direction;
said projector including means for producing a second signal that indicates each time said projected image is changed;
said projector including operator actuated means for actuating said means for moving said image bearing means in a forward or reverse direction;
tape transport means for said magnetic tape and including means for separating said cue tones from said audio accompaniment as said tape is moved in a fast forward or a fast reverse direction;
said tape transport means including means for moving said magnetic tape in a fast forward direction or a fast reverse direction;
said tape transport means including means for producing electrical signals that indicate whether said magnetic tape is moving in the fast forward or the fast reverse direction; and
automatic processing means coupled to said projector and said tape transport means and adapted to receive said first and second signals from said projector and said cue tones and said signals indicative of fast forward or fast reverse movement of said fast moving magnetic tape from said tape transport means;
said automatic processing means having a first output coupled to said tape transport means for selectively stopping said magnetic tape when it is moving in the fast forward or fast reverse direction;
said automatic processing means including means responsive to said signals coupled to said processing means for algebraically keeping a first count therein that is indicative of the synchronization, or distance and direction to synchronization, between said projected image and said sound accompaniment;
said first count being indicative of the number of cue tones to be produced by moving said magnetic tape to regain synchronization between said sound and said images;
said tape transport means including means to enable said magnetic tape to be moved in a fast forward direction to produce a number of cue tones equal to said first count to regain synchronization between said images and said sound;
said tape transport means including means to enable said magnetic tape to be moved in a fast reverse direction to produce a number of cue tones greater than said first count to regain synchronization between said images and said sound;
said processing means activating said first output to stop said magnetic tape when said tape is moved in said fast forward direction to produce said number of cue tones equal to said first count and activating said first output to stop said magnetic tape when said tape is moved in said fast reverse direction to produce said number of cue tones greater than said first count,
said processing means adapted to provide a second count therein that indicates the number of image changes, if any, that separate a current projected image from a reference image on said image bearing means;
said processing means having a second output coupled to said projector for selectively controlling said means for moving said image bearing means;
said processing means being selectively responsive to said second count to activate said second output to cause said means for moving said image bearing means to move said image bearing means to a position where said reference image is projected.

18. The apparatus according to claim 17 wherein said first count is positive when said magnetic tape must be moved in a forward direction to regain synchronization and said first count is negative when said magnetic tape must be moved in a reverse direction to regain synchronization.

19. The apparatus according to claim 17 wherein said tape transport means includes visual means to indicate to an operator the direction in which said magnetic tape must be moved to regain synchronization between said images and said tape; and said processing means includes a third output coupled to said visual means and operable to actuate said visual means in response to said first count.

20. The apparatus according to claim 17 wherein said apparatus includes visual means to indicate to an operator the direction in which said image bearing means must be moved to regain synchronization between said projected images and said magnetic tape.

21. The apparatus according to claim 19 wherein said tape transport means for moving said magnetic tape can be manually actuated by an operator.

22. The apparatus according to claim 17 wherein said processing means includes first manually operable means coupled thereto for resetting said first count therein so that said first count indicates synchronization between the then projected image and said sound accompaniment.

23. The apparatus according to claim 17 wherein said second count indicates the number of signals to be produced by moving said image bearing means to project said reference image and also indicates the direction said image bearing means must be moved to project said reference image.

24. The apparatus according to claim 23 wherein said second count is positive when said image bearing means must be moved in a forward direction to project said reference image and is negative when said image bearing means must be moved in a reverse direction to project said reference image.

25. The apparatus according to claim 17 wherein said processing means is made selectively responsive to said second count therein by second manually operable means coupled to said processor; and said processing means includes third manually operable means coupled thereto for resetting said second count therein whereby the then projected image on said image bearing means is caused to become said reference image.

26. The apparatus according to claim 25 wherein said tape transport includes a play mode of operation; and
said second and said third operable means include a single operator actuated means that resets said second count. when actuated while said tape transport is in said play mode of operation and which causes said processing means to be responsive to said second count when actuated when said magnetic tape is not moving.

27. The apparatus according to claim 26 wherein said processing means selectively responsive to said second count also causes said second count to be algebraically added to said first count at the time said processing means is selected to be responsive to said second count to enable said tape transport means to synchronize said sound with said reference image.

28. The apparatus according to claim 27 wherein said tape transport means causes said magnetic tape to be moved in a fast forward direction to produce a number of cue tones equal to the algebraic sum of said first count and said second count to synchronize said sound with said reference image.

29. The apparatus according to claim 28 wherein said tape transport means causes said magnetic tape to be moved in a fast reverse direction to produce a number of cue tones that is greater than the algebraic sum of said first count and said second count by a predetermined amount to synchronize said sound with said reference image.

30. Automatic audio-visual apparatus comprising:
image bearing means including a plurality of images;
a magnetic tape having an audio accompaniment thereon for said images and having associated cue tones recorded thereon;
a projector for projecting a series of said images on said image bearing means;
said projector including means for moving said image bearing means through said projector in a forward and in a reverse direction to change the projected image;
said projector including means for providing a pulse signal each time a projected image is changed by moving said image bearing means in a forward or reverse direction;
tape transport means for said magnetic tape and including means for separating said cue tones from said audio accompaniment as said tape is moved in a forward or a reverse direction; and
automatic processing means coupled between said projector and said tape transport means;
said processing means being adapted to receive said pulse signals indicative of said image changes to provide a count therein that indicates the number of image changes, if any, that separate a current projected image from a reference image on said image bearing means;
said processing means having an output coupled to said projector for controlling said means for moving said image bearing means;
said processor being selectively responsive to said count to cause said means for moving said image bearing means to move said image bearing means to a position where said reference image is projected;
said processor including means to synchronize said audio accompaniment on said magnetic tape with said projected reference image by counting said cue tones.

31. The apparatus according to claim 30 wherein said count is positive when said image bearing means must be moved in a forward direction to project said reference image and is negative when said image bearing means must be moved in a reverse direction to project said reference image.

32. The apparatus according to claim 30 wherein said projector includes means for providing a signal that indicates whether said image bearing means is moving in a forward or a reverse direction;
said processing means being adapted to receive said signals indicative of the direction of movement of said image bearing means.

33. The apparatus according to claim 30 wherein said processor is made selectively responsive to said count therein by first manually actuatable means coupled to said processing means.

34. The apparatus according to claim 33 wherein said processing means includes second manually actuatable means coupled thereto for resetting said count therein whereby the then projected image on said image bearing means is caused to become said reference image.

35. The apparatus according to claim 34 wherein said tape transport includes a play mode of operation; and
said first and second actuatable means include a single operator actuated means that resets said count when actuated while said tape transport is in said play mode of operation and which causes said processing means to be responsive to said count when actuated when said magnetic tape is not moving.

36. Apparatus for regaining synchronization between a series of image presentations and an audio accompaniment therefor that is recorded on a magnetic tape having associated cue tones recorded thereon comprising:
a projector including image bearing means and means for moving said image bearing means in said projector in a forward and in a reverse direction to change the projected image;

said projector including means for producing a first signal that indicates whether said image bearing means is moving in a forward or reverse direction;

said projector including means for producing a second signal that indicates each time said projected image is changed;

said projector including operator actuated means for actuating said means for moving said image bearing means in a forward or reverse direction;

tape transport means for said magnetic tape and including means for separating said cue tones from said audio accompaniment as said tape is moved in a forward or a reverse direction;

said tape transport means including means for moving said magnetic tape in a forward direction or a reverse direction;

said tape transport means including means for producing electrical signals that indicate whether said magnetic tape is moving in the forward or the reverse direction; and automatic processing means coupled to said projector and said tape transport means and adapted to receive said first and second signals from said projector and said cue tones and said signals indicative of forward or reverse movement of said magnetic tape from said tape transport means;

said automatic processing means having a first output coupled to said tape transport means for selectively stopping said magnetic tape when it is moving in the forward or reverse direction;

said automatic processing means including means responsive to said signals coupled to said processing means for keeping a count therein that indicates the number of image changes, if any, that separate a current projected image from a reference image on said image bearing means;

said processing means having a second output coupled to said projector for selectively controlling said means for moving said image bearing means;

said processing means being selectively responsive to said count to activate said second output to cause said means for moving said image bearing means to move said image bearing means to a position where said reference image is projected;

said processing means including means responsive to said cue tones for activating said first output to stop said magnetic tape when it is positioned in synchronization with said projected reference image.

37. The apparatus according to claim 36 wherein said tape transport means causes said magnetic tape to be moved in a forward direction to produce a number of cue tones equal to said count to synchronize said sound with said reference image.

38. The apparatus according to claim 36 wherein said tape transport means causes said magnetic tape to be moved in a reverse direction to produce a number of cue tones that is greater than said count by a predetermined amount to synchronize said sound with said reference image.

* * * * *